(12) United States Patent  (10) Patent No.: US 8,175,515 B1
Rivera  (45) Date of Patent: May 8, 2012

(54) DTV TERRESTRIAL SATELLITE CONVERSION APPARATUS

(76) Inventor: Daniel Rivera, Homestead, FL (US)

(*) Notice: Subject to any disclaimer, the term of this patent is extended or adjusted under 35 U.S.C. 154(b) by 739 days.

(21) Appl. No.: 12/263,116

(22) Filed: Oct. 31, 2008

(51) Int. Cl.
*H04H 20/74* (2008.01)
(52) U.S. Cl. .......... 455/3.02; 725/63; 343/872
(58) Field of Classification Search .......... 455/3.02, 455/562.1, 575.7; 343/718, 775, 779, 878, 343/906; 342/350, 352, 359, 367; 725/63, 725/66–68, 73
See application file for complete search history.

(56) References Cited

U.S. PATENT DOCUMENTS 5,933,123 A * 8/1999 Kaul .............................. 343/879
2007/0018905 A1* 1/2007 Kato et al. ..................... 343/906
* cited by examiner

*Primary Examiner* — Lana N Le
*Assistant Examiner* — Golam Sorowar
(74) *Attorney, Agent, or Firm* — Albert Bordas, P.A.

(57) ABSTRACT

A digital television terrestrial satellite conversion apparatus comprising a transformer assembly that houses a matching transformer, and an insulator assembly. A bolt assembly has mounting means to mount the transformer assembly and the insulator assembly onto a satellite dish assembly. Means to increase a digital radio frequency signal exists by reflective gain from a rear of an array for receiving terrestrial digital and high-definition broadcast signals by the satellite dish assembly. A bridge coaxial cable extends from the matching transformer. The bridge coaxial cable transmits the terrestrial digital and high-definition broadcast signals.

18 Claims, 3 Drawing Sheets

DTV TERRESTRIAL SATELLITE CONVERSION APPARATUS

BACKGROUND OF THE INVENTION

1. Field of the Invention

The present invention relates to satellite accessories, and more particularly, to a digital television terrestrial satellite conversion apparatus.

2. Description of the Related Art

Satellite dishes are parabolic antennas that receive or transmit electromagnetic signals to and from another location, typically a satellite. They are often used to receive satellite television. However, Applicant is not aware of any apparatus with means to increase a digital radio frequency signal by reflective gain from a rear of an array for receiving terrestrial digital and high-definition broadcast signals by a satellite dish assembly.

SUMMARY OF THE INVENTION

The instant invention is a digital television terrestrial satellite conversion apparatus comprising a transformer assembly that houses a matching transformer, and an insulator assembly. A bolt assembly has mounting means to mount the transformer assembly and the insulator assembly onto a satellite dish assembly. The instant invention also has means to increase a digital radio frequency signal by reflective gain from a rear of an array for receiving terrestrial digital and high-definition broadcast signals by the satellite dish assembly. A bridge coaxial cable extends from the matching transformer. The bridge coaxial cable transmits the terrestrial digital and high-definition broadcast signals.

The transformer assembly comprises a housing that abuts a reflector plate. The housing has a first at least one hole and the reflector plate has a second at least one hole. The housing is hermetically sealed, and the matching transformer is of approximately of 300 ohm-75 ohm.

The insulator assembly comprises first and second arms extending in opposite directions from a base having a first at least one hole. The first and second arms each have a channel to receive first and second elongated elements. The base is made of a non-conducting material. The first and second arms are made of a conducting material, as are the first and second elongated elements. The conducting material is aluminum. The first and second elongated elements each comprise at least one capacitive hat.

The bolt assembly is bolted to the satellite dish assembly, and secures the housing to the reflector plate, the reflector plate to the insulator assembly, and the insulator assembly onto the bolt assembly. The terrestrial digital and high-definition broadcast signals are transmitted to a preamplifier that is mounted onto the satellite dish assembly. The satellite dish assembly is mounted and facing television broadcast towers.

It is therefore one of the main objects of the present invention to provide a digital television terrestrial satellite conversion apparatus with means to increase a digital radio frequency signal by reflective gain from a rear of an array for receiving terrestrial digital and high-definition broadcast signals by a satellite dish assembly.

It is another object of this invention to provide such an apparatus that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
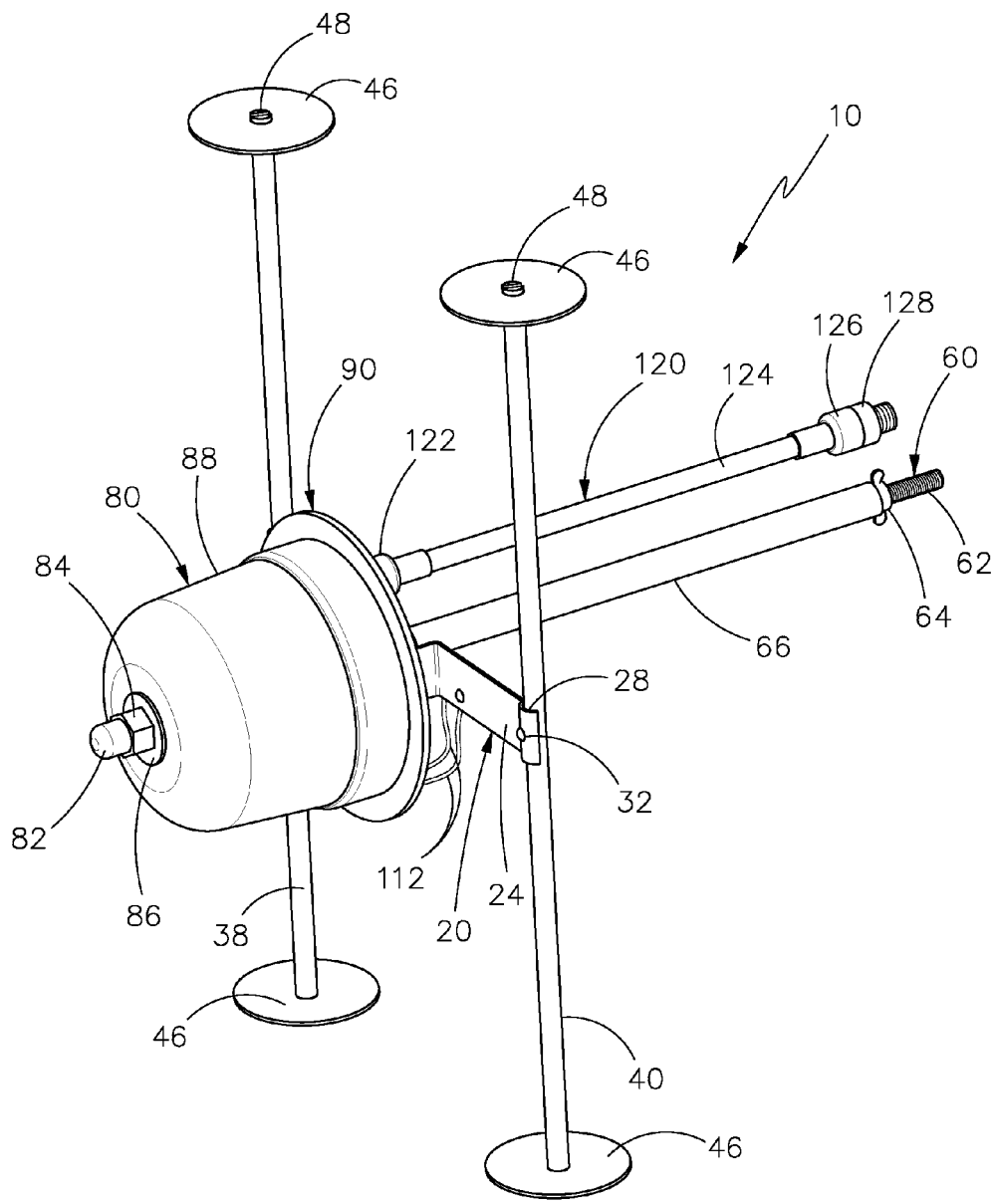
FIG. 1 illustrates an isometric view of the present invention.

Referring now to the drawings, the present invention is generally referred to with numeral 10. It can be observed that it basically includes insulator assembly 20, bolt assembly 60, transformer assembly 80, matching transformer 110, and bridge coaxial cable 120.

As seen in FIG. 1, instant invention 10 is a digital television terrestrial satellite conversion apparatus. Bolt assembly 60 secures housing 88 to reflector plate 90, whereby housing 88 abuts reflector plate 90. In the preferred embodiment, housing 88 comprises a center through hole to receive bolt assembly 60. Housing 88 is weather-proof and hermetically sealed to resist weather conditions including wind and several kinds of precipitation such as rain, freezing rain, snow, hail, and sleet. Bolt assembly 60 also secures reflector plate 90 to insulator assembly 20, and insulator assembly 20 thereon.

Figure 2:
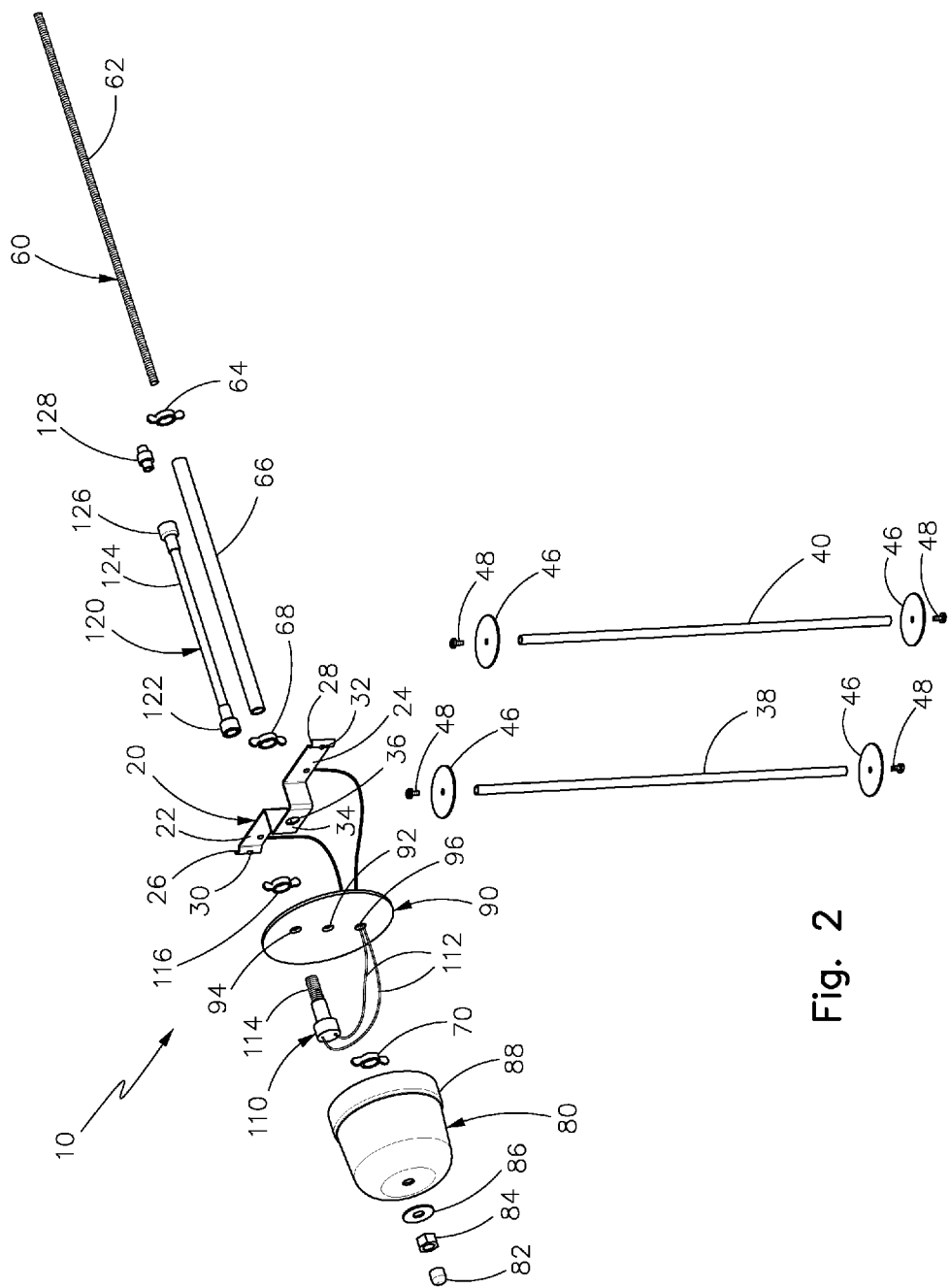
FIG. 2 illustrates an exploded view of the present invention.

As seen in FIG. 2, transformer assembly 80 comprises tip cover 82, nut 84, and washer 86 that, with wing nut 70, secure housing 88 to bolt 62. Transformer assembly 80 also comprises reflector plate 90 that has holes 92; 94; and 96. Transformer assembly 80 contains matching transformer 110. Matching transformer 110 comprises leads 112, threads 114, and nut 116. Reflector plate 90 comprises hole 94 to receive threads 114, where nut 116 is tightened thereon. Reflector plate 90 also comprises hole 96 to receive leads 112 that terminate at arms 22 and 24 of insulator assembly 20. In the preferred embodiment, matching transformer 110 is approximately of 300 ohm-75 ohm. Reflector plate 90 comprises hole 92 that is centrally disposed to receive bolt 62.

Insulator assembly 20 comprises arms 22 and 24 extending in opposite directions from base 34. Base 34 has hole 36. Arms 22 and 24 have channels 26 and 28 to receive elongated elements 38 and 40 respectively. Elongated elements 38 and 40 comprise holes 42 and 44 to receive rivets 30 and 32 respectively for securing upon arms 22 and 24. Elongated elements 38 and 40 each comprise capacitive hats 46 at their distal ends. As an extension of elongated elements 38 and 40, capacitive hats 46 increase their overall surface area. The increase in overall surface area increases the reception of both ultra high frequency, UHF, and very high frequency, VHF channels widening bandwidth, and terrestrial digital and high-definition broadcast signals. Capacitive hats 46 can be secured with screws 48, or rivets as an example. Base 34 is made of a non-conducting material, which can be plastic or another material having similar characteristics. Arms 22 and 24 and elongated elements 38 and 40 are made of a conducting material, which can be aluminum or another material having similar characteristics.

Bolt assembly 60 comprises bolt 62, wing nut 64, sleeve 66, and wing nuts 68 and 70. Bolt assembly 60 has mounting means to mount transformer assembly 80 and insulator assembly 20 onto satellite dish 152 as better seen in FIG. 3.

Bridge coaxial cable 120 comprises connector 122 that also tightens upon threads 114 of matching transformer 110. Cable 124 extends and terminates at connector 126. Connector 126 in turn connects to dual male connector 128.

Figure 3:
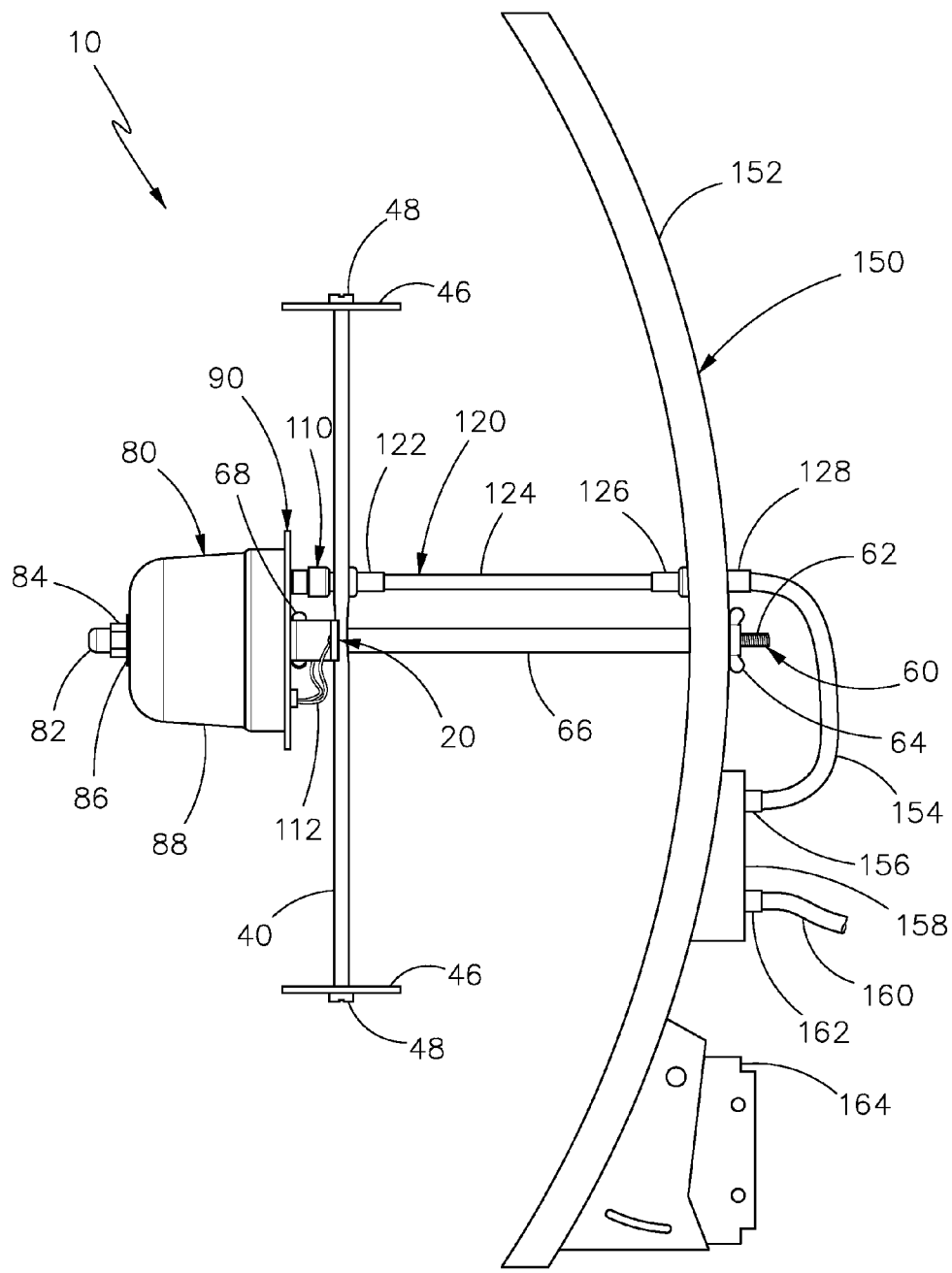
FIG. 3 illustrates a side elevational view of the present invention mounted onto a satellite dish assembly.

As illustrated in FIG. 3, satellite dish assembly 150 comprises satellite dish 152. Satellite dish 152 is parabolic antenna that receives or transmits electromagnetic signals to and from another location, typically a satellite, and is used to receive satellite television. Satellite dish assembly 150 also comprises cable 154 that connects from dual male connector 128 and terminates at connector 156. Connector 156 connects to preamplifier 158. The terrestrial digital and high-definition broadcast signals are transmitted to preamplifier 158. Extending from preamplifier 158 is cable 160 having connector 162. Satellite dish assembly 150 may also comprise base frame 164 for mounting onto a structure or surface to support it.

More specifically, in operation radio frequency (RF) is the frequency or rate of oscillation within the range of about 3 Hz to 300 GHz. This range corresponds to frequency of alternating current electrical signals used to produce and detect radio waves. Instant invention 10 comprises means to increase a reception of both ultra high frequency, UHF, and very high frequency, VHF channels widening band width, and digital radio frequency signal by reflective gain from a rear of an array for receiving terrestrial digital and high-definition broadcast signals by satellite dish assembly 150. As best seen in this illustration, bridge coaxial cable 120 is secured onto threads 114 of matching transformer 110. Bridge coaxial cable 120 transmits terrestrial digital and high-definition broadcast signals. In the preferred embodiment, satellite dish 152 is mounted and faces television broadcast towers.

The foregoing description conveys the best understanding of the objectives and advantages of the present invention. Different embodiments may be made of the inventive concept of this invention. Such as in an alternate embodiment, an integrated amplifier may replace matching transformer 110. It is to be understood that all matter disclosed herein is to be interpreted merely as illustrative, and not in a limiting sense.

What is claimed is:

1. A digital television terrestrial satellite conversion apparatus, comprising:
    A) a transformer assembly that houses a matching transformer;
    B) an insulator assembly comprising first and second arms extending in opposite directions from a base having a first at least one hole, said first and second arms each have a channel to receive first and second elongated elements;
    C) a bolt assembly having mounting means to mount said transformer assembly and said insulator assembly onto a satellite dish assembly; and
    D) means to increase a digital radio frequency signal for receiving terrestrial digital and high-definition broadcast signals by said satellite dish assembly.

2. The digital television terrestrial satellite conversion apparatus set forth in claim 1, further comprising a bridge coaxial cable extending from said matching transformer, said bridge coaxial cable transmits said terrestrial digital and high-definition broadcast signals.

3. The digital television terrestrial satellite conversion apparatus set forth in claim 1, further characterized in that said transformer assembly comprises a housing that abuts a reflector plate, said housing having a first at least one hole and said reflector plate having a second at least one hole.

4. The digital television terrestrial satellite conversion apparatus set forth in claim 3, further characterized in that said bolt assembly is bolted to said satellite dish assembly, and secures said housing to said reflector plate, said reflector plate to said insulator assembly, and said insulator assembly onto said bolt assembly.

5. The digital television terrestrial satellite conversion apparatus set forth in claim 3, further characterized in that said housing is hermetically sealed.

6. The digital television terrestrial satellite conversion apparatus set forth in claim 1, further characterized in that said matching transformer is of approximately of 300 ohm-75 ohm.

7. The digital television terrestrial satellite conversion apparatus set forth in claim 1, further characterized in that said base is made of a non-conducting material.

8. The digital television terrestrial satellite conversion apparatus set forth in claim 1, further characterized in that said first and second arms are made of a conducting material.

9. The digital television terrestrial satellite conversion apparatus set forth in claim 8, further characterized in that said conducting material is aluminum.

10. The digital television terrestrial satellite conversion apparatus set forth in claim 1, further characterized in that said first and second elongated elements are made of a conducting material.

11. The digital television terrestrial satellite conversion apparatus set forth in claim 10, further characterized in that said conducting material is aluminum.

12. The digital television terrestrial satellite conversion apparatus set forth in claim 1, further characterized in that said first and second elongated elements each comprise at least one capacitive hat.

13. The digital television terrestrial satellite conversion apparatus set forth in claim 1, further characterized in that said terrestrial digital and high-definition broadcast signals are transmitted to a preamplifier.

14. The digital television terrestrial satellite conversion apparatus set forth in claim 13, further characterized in that said preamplifier is mounted onto said satellite dish assembly.

15. The digital television terrestrial satellite conversion apparatus set forth in claim 1, further characterized in that said satellite dish assembly is mounted and facing television broadcast towers.

16. A digital television terrestrial satellite conversion apparatus, comprising:
    A) a transformer assembly that houses a matching transformer, said transformer assembly comprises a housing that abuts a reflector plate, said housing having a first at least one hole and said reflector plate having a second at least one hole;
    B) an insulator assembly comprising first and second arms extending in opposite directions from a base having a first at least one hole, said first and second arms each have a channel to receive first and second elongated elements;
    C) a bolt assembly having mounting means to mount said transformer assembly and said insulator assembly onto a satellite dish assembly;
    D) means to increase a digital radio frequency signal for receiving terrestrial digital and high-definition broadcast signals by said satellite dish assembly; and
    E) a bridge coaxial cable extending from said matching transformer, said bridge coaxial cable transmits said terrestrial digital and high-definition broadcast signals.

17. The digital television terrestrial satellite conversion apparatus set forth in claim 16, further characterized in that said first and second elongated elements each comprise at least one capacitive hat.

18. The digital television terrestrial satellite conversion apparatus set forth in claim 16, further characterized in that said bolt assembly is bolted to said satellite dish assembly, and secures said housing to said reflector plate, said reflector plate to said insulator assembly, and said insulator assembly onto said bolt assembly, said terrestrial digital and high-definition broadcast signals are transmitted to a preamplifier.

\* \* \* \* \*